United States Patent [19]
Kumada

[11] Patent Number: 5,469,220
[45] Date of Patent: Nov. 21, 1995

[54] VERTICAL SYNCHRONIZING CIRCUIT

[75] Inventor: Kouji Kumada, Tenri, Japan

[73] Assignee: Sharp Kabushiki Kaisha, Japan

[21] Appl. No.: 305,332

[22] Filed: Sep. 15, 1994

[30] Foreign Application Priority Data

Sep. 21, 1993 [JP] Japan ................... 5-234955

[51] Int. Cl.$^6$ .................................. H04N 5/10
[52] U.S. Cl. ............................ 348/529; 348/530
[58] Field of Search .................... 348/529, 530, 348/525, 526, 536, 547, 548, 542, 543; H04N 5/08, 5/10, 5/12, 5/04, 5/05

[56] References Cited

U.S. PATENT DOCUMENTS

| | | | |
|---|---|---|---|
| 4,556,905 | 12/1985 | Ikejiri | 348/547 |
| 4,694,340 | 9/1987 | Tanaka | 348/529 |
| 4,792,852 | 12/1988 | Narusawa | 348/530 |

FOREIGN PATENT DOCUMENTS 59-15595  4/1959  Japan .
60-42664  9/1985  Japan .

*Primary Examiner*—Victor R. Kostak
*Assistant Examiner*—Michael H. Lee
*Attorney, Agent, or Firm*—Nixon & Vanderhye

[57] ABSTRACT

A vertical sync signal circuit for producing a stable sync signal is disclosed. A first frequency divider and a first window circuit generate a sync output pulse PC having the same period as the vertical sync signal contained in the TV signal and a first window signal W1. A reference signal generator generates a reference signal VR in synchronism with the vertical sync signal VS being input. A second frequency divider and a second window circuit generate a second window signal W2 wider than the first window signal W1. A third frequency divider discriminates the period of the reference signal VR on the basis of the first window signal W1 and the second window signal W2, and selects the sync output pulse PC1 or the reference signal VR. The sync signal CVD having the same period as the sync output pulse PC or the reference signal VR, as the case may be, is produced through an output switching circuit. As a result, a sync signal CVD in synchronism with the vertical sync signal VS is output always in a stable manner.

6 Claims, 15 Drawing Sheets

FIG. 8
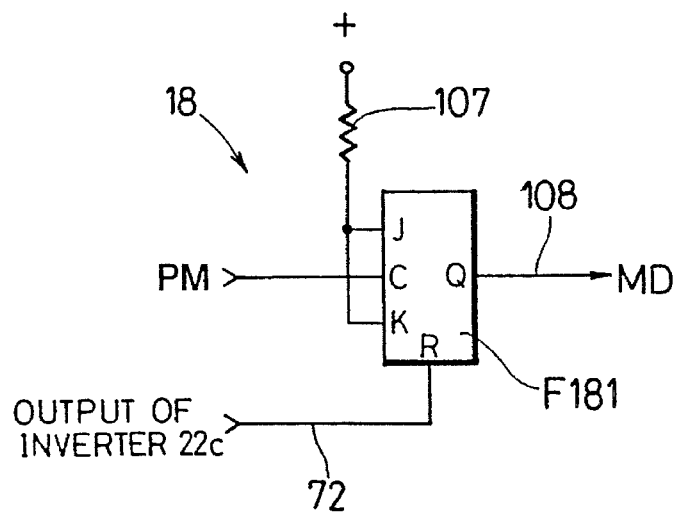
FIG. 9 (1)
FIG. 9 (2)
FIG. 9 (3)
FIG. 10 (1)
FIG. 10 (2)
FIG. 10 (3)

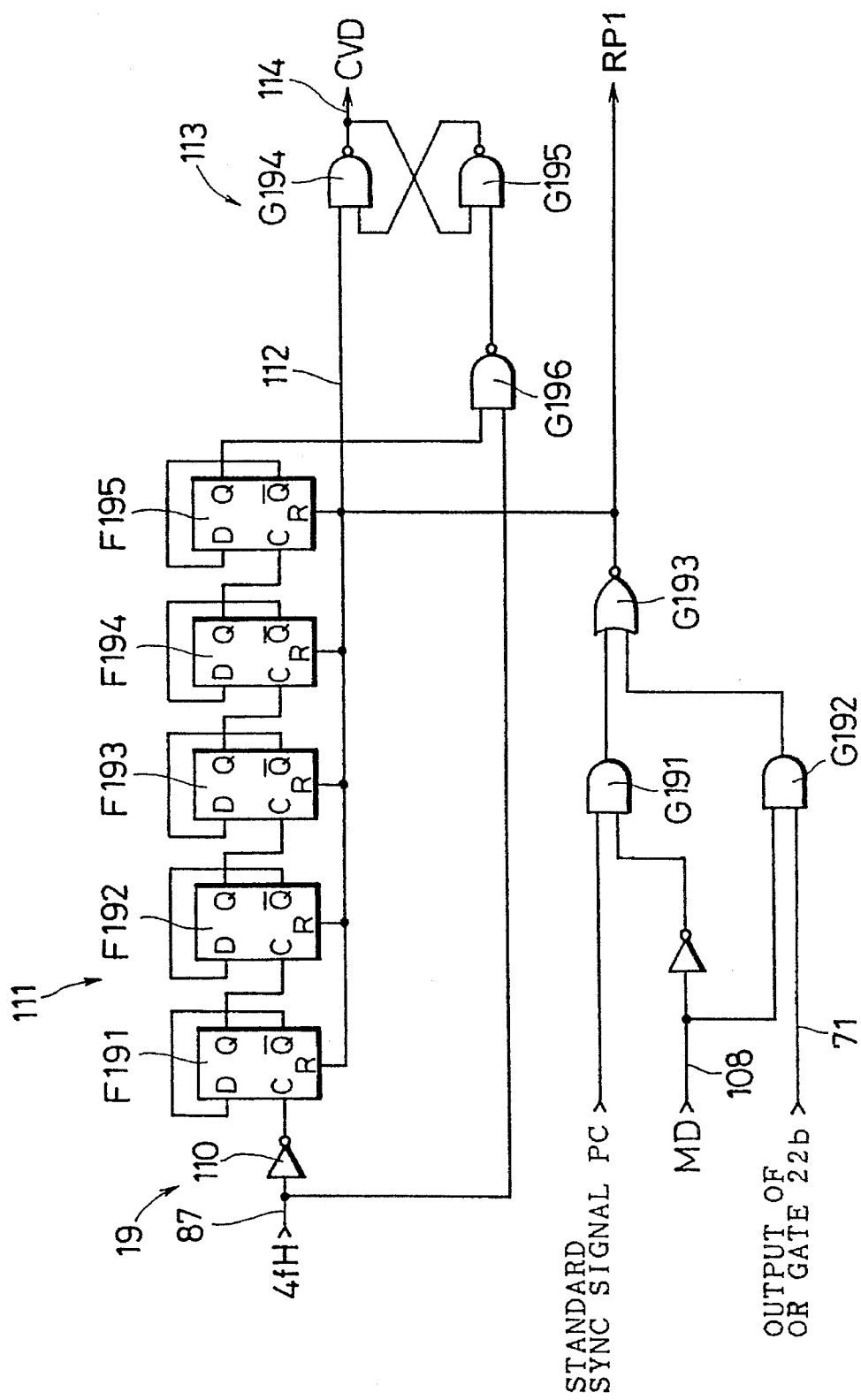

VERTICAL SYNCHRONIZING CIRCUIT

BACKGROUND OF THE INVENTION

1. Field of the Invention

The present invention relates to a vertical synchronizing circuit, or more specifically to a vertical synchronizing circuit of count-down type suitably embodied for TV receivers or the like used in an environment with varying electric field intensity.

2. Description of the Related Art

The TV receiver or the like operated in an environment with varying electric field intensity like a vehicle-mounted TV, as disclosed in Examined Patent Application JP-B2 59-15595 (1984) or Examined Patent Application JP-B2 60-42664 (1985), uses a vertical sync circuit of count-down type in order to stabilize the vertical scanning operation. For this purpose, a clock signal NfH having a frequency N times (N: a natural number of 2 or more) the frequency fH of the horizontal sync signal extracted from the input TV composite signal through a sync separator circuit is produced. This clock signal NfH is frequency-divided by a frequency divider in synchronism with the vertical sync sign. A frequency-divided signal having a frequency equal to the vertical sync signal is thus generated as a count-down vertical sync signal, and is applied to a vertical deflection circuit for vertical scanning.

In the NTSC system which is the standard TV system in Japan, for example, the frequency ratio fV/fH between the vertical sync signal VS and the horizontal sync signal HS contained in the TV composite signal is 60/15750= 1/262.5. A vertical sync signal is therefore obtained by dividing the signal N times the frequency of the horizontal sync signal by N×262.5. In that process, in order to remove the instability sync elements such as drifts or jitters, a reference signal generator and a phase comparator are provided. A reference signal in synchronism with the vertical sync signal is generated by the reference signal generator on the basis of the horizontal sync signal, and the phase of the frequency-divided signal is compared with that of the reference signal by the phase comparator. When a phase drift is detected, a reset signal is output from the phase comparator to the frequency divider. In this way, a frequency-divided signal always in synchronism with the vertical sync signal is output as a count-down vertical sync signal thereby to perform stable vertical scanning operation free of jitters and drifts.

A typical prior art circuit is shown in the block diagram of FIG. 18. In FIG. 18, a TV receiving circuit 51 includes a tuner, an intermediate frequency amplifier, a detector and a video amplifier. A signal processing circuit 52 is for reproducing and amplifying a luminance signal and a chrominance signal A display device 53 is realized by display means such as a cathode-ray tube. A sync separator 54 is for separating and extracting the horizontal sync signal HS and the vertical sync signal VS from the TV composite signal applied thereto. The period of the vertical sync signal VS used for TV broadcasting is hereinafter referred to as the standard period (262.5 H, where H is the period of the horizontal sync signal HS).

A horizontal deflection circuit 55 is for electrically energizing the horizontal deflection coil HL, and a vertical deflection circuit 56 for electrically energizing the vertical deflection coil VL. These circuits are identical to those used for a common TV receiver. The vertical sync signal VS, however, is applied to a reference signal generator 63. A vertical sync circuit of count-down type (hereinafter referred to as "the vertical sync circuit") 71 includes a frequency doubler 61, a frequency divider 62, a reference signal generator 63 and a phase comparator 64.

The horizontal sync signal HS is applied to the frequency doubler 61 for generating a clock signal 2fH having a frequency (=31,500 Hz) twice that of the horizontal sync signal HS, which clock signal is applied to the frequency divider 62 and the reference signal generator 63. The clock signal 2fH is frequency-divided to 1/525 by flip-flops 62a to 62j and a NAND gate 62k in the frequency divider 62, and in synchronism with the vertical sync signal VS, a count-down vertical sync signal VD having a frequency equal to the frequency fV thereof is generated.

The reference signal generator 63 includes a reset signal circuit 63a having a D-type flip-flop and a NAND gate, a counter 63b having two stages of flip-flops, and a pulse generator 63c having a NAND gate and an R-S flip-flop. The clock signal 2fH and the vertical sync signal VS are applied to the reset signal circuit 63a thereby to generate a reset signal RC in synchronism with the vertical sync signal VS. The counter 63b is for counting the clock signal 2fH in synchronism with the vertical sync signal VS by the reset signal RC, and produces a counter pulse OC for each 262.5 H which is the standard period. The clock signal 2fH applied to the pulse generator 63c is gated by use of the counter pulse OC, so that the pulse generator 63c outputs a reference signal VR always in synchronism with the vertical sync signal VS.

The reference signal VR is compared with the count-down vertical sync signal VD in phase by the NAND gate of the phase comparator 64. In the case where the reference signal VR and the count-down vertical sync signal VD are out of phase, a reset signal RD is output from the phase comparator 64 and applied to the reset terminal R of the flip-flops 62a to 62j which constitutes the frequency divider 62. Thus the operation is performed for synchronizing the count-down vertical sync signal VD produced from the frequency divider 62 with the vertical sync signal VS. The reference signal VR used for this synchronization is generated on the basis of the clock signal 2fH having a frequency twice that of the horizontal sync signal HS and the vertical sync signal VS as described above. Therefore, a stable count-down vertical sync signal VD not affected by the receiving conditions of the TV signal, drift or jitter is obtained, thereby contributing to picture stabilization.

The conventional vertical sync circuit 71 described above, in which the period of the vertical sync signal VS is defined as the standard period of 262.5 H, is effective when supplied with the vertical sync signal VS for TV broadcasting. A problem of this conventional vertical sync circuit, however, is that an out-of-phase condition occurs with the periods for special VTR reproduction mode other than the standard periods such as in still image, slow reproduction or search mode.

In the case where a vertical sync signal having a non-standard period of 263.5 H is applied, for example, it is determined that the reference signal VR is overlapped in phase with the frequency-divided signal VD so that the frequency-divided signal VD of the standard period is applied to the vertical deflection circuit 56 during a given period. Subsequently, at a time point when the reference signal VR ceases to be contained in the pulse period of the frequency-divided signal. VD due to the out-of-phase condition, one of the flip-flops 62a to 62j of the frequency divider 62 is reset by the reference signal VR, with the result that the frequency-divided signal VD comes into phase with the vertical sync signal having a non-standard period of 263.5 H extracted at the sync separator 54. After that, the synchronization with the standard period occurs due to an out-of-phase condition. This series of operation is repeated. Consequently, the vertical synchronization becomes unstable with the display screen swinging vertically, for example.

SUMMARY OF THE INVENTION

The object of the invention is to solve the above-mentioned problems of the prior art and to provide a vertical sync circuit of count-down type which stably operates also against the vertical sync signal of other than the standard period used for TV broadcasting.

According to one aspect of the invention, there is provided a vertical sync circuit comprising means for generating a reference clock signal having a frequency N times (N: a natural number of 2 or more) the frequency of a horizontal sync signal extracted from a TV composite signal input thereto, means for generating a reference signal in phase with the vertical sync signal extracted from the TV composite signal on the basis of the particular vertical sync signal and the reference clock signal, a first discrimination signal generator for generating a standard period signal having a period equal to the vertical sync signal determined according to a particular broadcasting system and a first window signal having a pulse width set in advance around the timing of outputting the standard period signal on the basis of the reference clock signal, a second discrimination signal generator for generating and outputting a second window signal set with a pulse width larger than the first window signal in advance on the basis of the reference clock signal, and sync signal output means for determining which of the first window signal and the second window signal contains the period of the reference signal, selecting the standard period signal or the index signal on the basis of the result of determination, and outputting a sync signal having the same period as the selected signal.

According to another aspect of the invention, there is provided a vertical sync circuit further comprising means for generating a timing control signal for advancing the timing of outputting the standard period signal from the first discrimination signal generator by a predetermined length of time.

According to still another aspect of the invention, there is provided a vertical sync circuit to which the horizontal sync signal and the vertical sync signal extracted from the TV composite signal are applied. Also, the reference clock signal generator generates a reference clock signal having a frequency N times (N: a natural number of 2 or more) the horizontal sync signal, and the reference signal generator generates a reference signal in synchronism with an input vertical sync signal on the basis of the vertical sync signal and the reference clock signal.

According to a further aspect of the invention, there is provided a vertical sync circuit, wherein the first discrimination signal generator generates a standard period signal having a period equal to that of the vertical sync signal determined according to the particular TV broadcasting system and a first window signal for discriminating the standard period on the basis of the reference clock signal, and the second discrimination signal generator generates a second window signal set with a pulse width larger than the first window signal in advance.

According to a still further aspect of the invention, there is provided a vertical sync circuit, wherein the sync signal output means determines which of the first window signal and the second window signal contains the period of the reference signal, selects the standard period signal or the reference signal on the basis of the result of determination, and outputs a sync signal having the same period as the selected signal. Also, in the case where the reference signal drops off, the sync signal immediately before the drop-off is output continuously for a predetermined length of time, followed by selecting the standard period signal and outputting a sync signal having the same period as the standard period signal.

Consequently, the vertical sync circuit according to the invention outputs a sync signal having the same period as and in synchronism with the input signal regardless of whether the period of the input vertical sync signal is standard or non-standard. Also, even during a temporary signal drop-off, a constantly stable sync signal is produced.

According to a yet further aspect of the invention, there is provided a vertical sync circuit, wherein the timing control signal output from the timing control signal generator is used to advance by a predetermined length of time the timing of the standard period signal output from the first discrimination signal generator in selecting the standard period signal a predetermined time after drop-off of the reference signal. As a result, the appearance of the vertical flyback period on the screen which otherwise might occur at the time of selecting the standard period signal is prevented.

As described above, according to the vertical sync circuit of the invention, a reference clock signal is generated based on the horizontal sync signal by the reference clock signal generator, and a reference signal based on the vertical sync signal by the reference signal generator. Also, the first discrimination signal generator generates a standard period signal having a period equal to that of the vertical sync signal according to the particular TV broadcasting system based on the reference clock signal and a first window signal for discriminating the standard period, while the second discrimination signal generator generates a second window signal set in a range wider than the standard period in advance.

According to another aspect of the invention, there is provided a vertical sync circuit, wherein the sync signal output means determine which of the first window signal or the second window signal contains the period of the reference signal, selects the standard period signal or the reference signal on the basis of the result of determination, and outputs a sync signal having the same period as the selected signal. Also, in the case where the reference signal drops off, the sync signal immediately before the drop-off is continuously output for a predetermined length of time, followed by selecting the standard period signal and outputting a sync signal having the same period as the standard period signal.

According to still another aspect of the invention, there is provided a vertical sync circuit, wherein the timing control signal produced from the timing control signal generator is used to advance the timing of first discrimination signal generator outputting the standard period signal by a predetermined length of time at the time of selecting the standard period signal a predetermined time after the drop-off of the reference signal.

As a consequence, regardless of whether the period of the input vertical sync signal has a standard period or non-standard period, a sync signal in synchronism with and having the same period as the vertical sync signal is stably and accurately produced. A stable sync signal can thus be secured even when the vertical sync signal has no standard period or the TV signal is received with a weak electric field intensity or in a noisy environment as in special playback mode of VTR. Also, the sync signal immediately before a signal drop-off is sustained for a predetermined length of time, and therefore, the out-of-phase condition is prevented, with the standard period restored automatically after the lapse of a predetermined length of time. In that process, the timing control prevents the flyback period from appearing on the screen, thus always securing a normal screen image.

BRIEF DESCRIPTION OF THE DRAWINGS

Other and further objects, features, and advantages of the invention will be more explicit from the following detailed description taken with reference to the drawings wherein:

FIG. 8 is a block diagram showing a specific configuration of a mode switching circuit 18;

FIGS. 9(1)–9(3) are diagrams showing waveforms for explaining the operation of the mode switching circuit 18 shown in FIG. 8;

FIGS. 10(1)–10(3) are diagrams showing waveforms for explaining another operation of the mode switching circuit 18 shown in FIG. 8;

FIG. 11 is a block diagram showing a specific configuration of an output switching circuit 19;

DETAILED DESCRIPTION OF THE PREFERRED EMBODIMENTS

Figure 1:
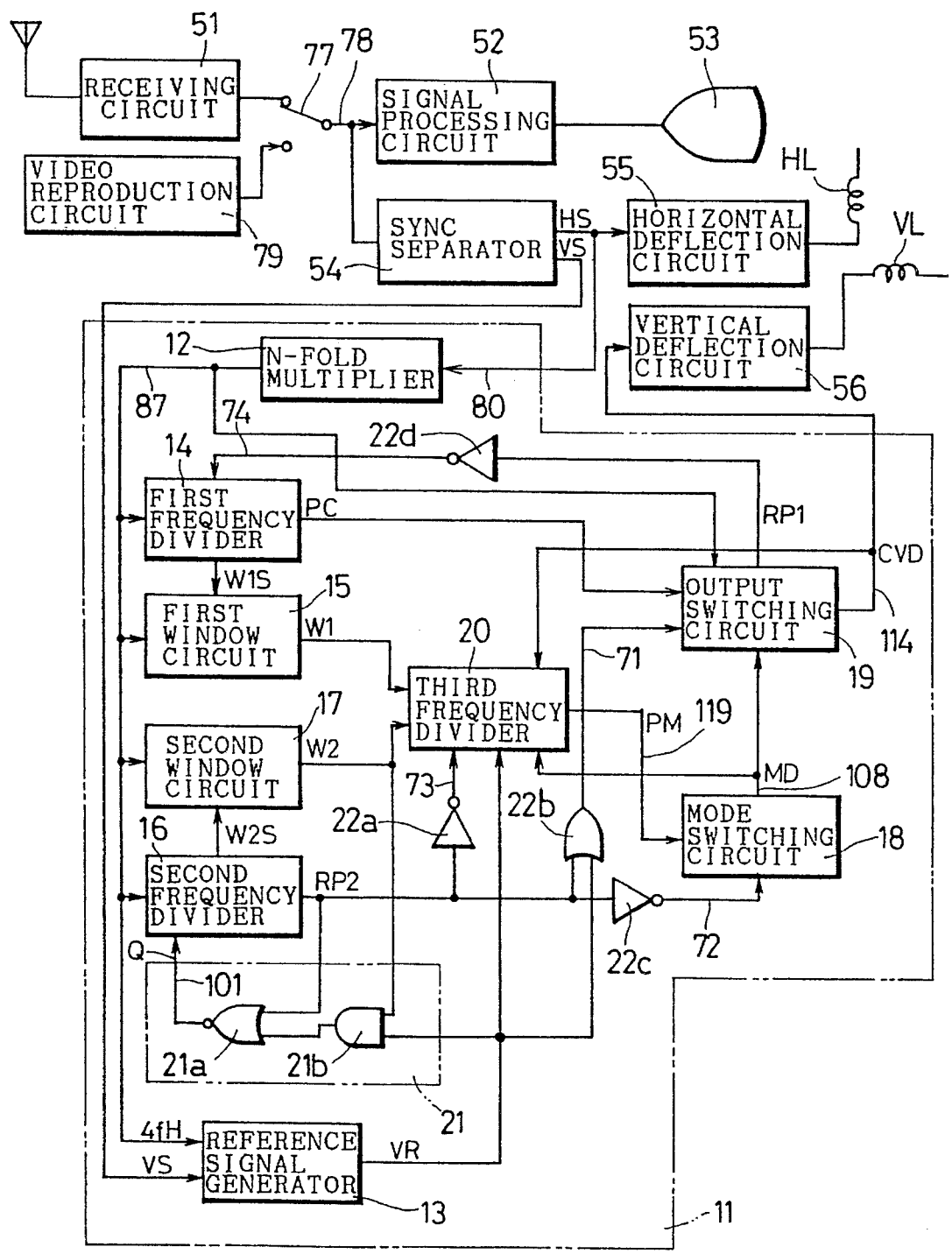
FIG. 1 is a block diagram showing the electrical configuration of a vertical sync circuit according to an embodiment of the invention.

Now referring to the drawings, preferred embodiments of the invention are described below.

A block diagram of the electrical configuration according to an embodiment of the invention is shown in FIG. 1. In FIG. 1, a TV receiving circuit 51 includes a tuner, an intermediate frequency amplifier, a detection circuit and a video amplifier. A signal processing circuit 52 reproduces and amplifies a luminance signal and a chrominance signal. A composite video signal from the receiving circuit 51 is applied through a change-over switch 77 and line 78 to the signal processing circuit 52 and a sync separator 54. Also, the composite video signal reproduced from a video magnetic tape by reproducing means 79 is switched by the change-over switch 77 and applied to line 78.

A visual display device 53 is realized by display means such as a cathode-ray tube. The sync separator 54 separates and extracts the horizontal sync signal HS and the vertical sync signal VS from the TV receiver signal. A horizontal deflection circuit 55 and a vertical deflection circuit 56 are for electrically energizing the horizontal deflection coil HL and the vertical deflection coil VL, respectively. These circuits are the same as those of the conventional TV receiver. However, the horizontal sync signal HS extracted through the sync separator 54, is applied to the horizontal deflection circuit 55 and a frequency N-fold multiplier 12, while the vertical sync signal VS is applied to the reference signal generator 13.

A vertical sync circuit 11 according to the invention is defined by a two-dot chain in FIG. 1. The frequency N-fold multiplier 12 which is a reference clock signal generator outputs a reference clock signal 4fH of a frequency (= 63,000 Hz) four times that of the horizontal sync signal HS. The multiple of 4 is intended to facilitate the processing with 0.25 H as a unit of counting. Alternatively, two or larger natural numbers can be used with equal effect. The reference clock signal 4fH is applied to a first frequency divider 14, a first window circuit 15, a second frequency divider 16, a second window circuit 17 and a reference signal generator 13 separately as described later.

Figure 2:
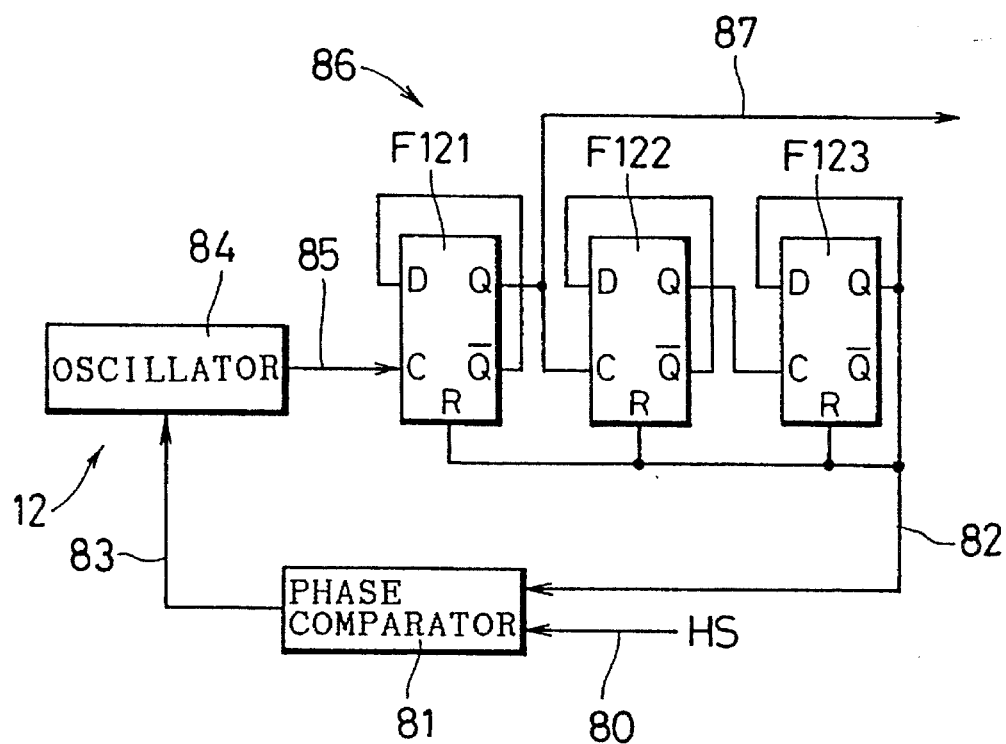
FIG. 2 is an electrical circuit diagram showing a specific configuration of a frequency N-fold multiplier 12.

A block diagram of a specific configuration of the frequency N-fold multiplier 12 is shown in FIG. 2. The horizontal sync signal from a sync separator 54 is applied through line 80 to a phase comparator 81. The phase comparator 81 compares the phase of the signal from line 82 with the phase of the horizontal sync signal from line 80 and outputs the result of comparison to line 83. The voltage applied to line 83 is a voltage with zero phase difference between the signals from lines 80 and 82. The voltage from line 83 is applied to a voltage-controlled oscillator 84. The oscillation frequency of the oscillator 84 is applied from line 85 to the clock input terminal C of the first-stage F121 of D-type flip-flops F121, F122 and F123 connected in cascade making up a frequency divider 86. Upon application of the leading edge of the signal to the clock input terminal C, the D-type flip-flop 121 leads out a binary signal applied to the data input terminal D to an output terminal Q, and an inverted signal of the output of the output terminal Q is led to another output terminal $\overline{Q}$. Also, with a reset signal applied to the reset input terminal R, the output terminal Q is set to L level. A reference clock signal 4fH is led out from the first-stage output terminal Q through line 87. The output from the output terminal Q of the last-stage flip-flop F123 is led out to line 82 and applied to the phase comparator 81 as described above. In this way, a phase-locked loop frequency synthesizer is constructed. This frequency N-fold multiplier 12 is such that a reference clock signal having a frequency approximate to the frequency of the horizontal sync signal in a predetermined standard mode for a particular TV system is led out from line 87 even when the horizontal sync signal HS fails to be input.

The reference signal generator 13 which is a reference signal generating means is for generating a reference signal VR having a predetermined pulse width at the rise of the reference clock signal 4fH immediately after the rise of the input vertical sync signal VS. This reference signal VR is applied to a third frequency divider 20, an output switching circuit 19 and a self-resetting circuit 21. The reference signal VR forms an index signal for determining the period of the input vertical sync signal VS on the one hand and is used as a reset signal or a timing control signal for generating a count-down vertical sync signal CVD during the non-standard period on the other hand.

Figure 3:
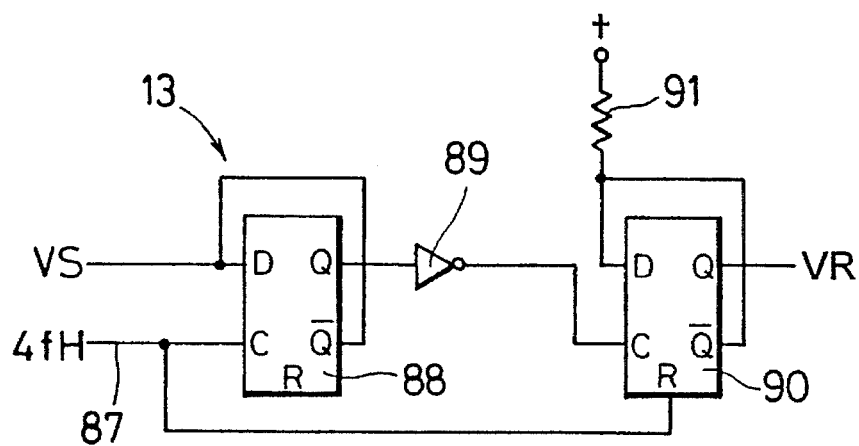
FIG. 3 is block diagram showing a specific configuration of a reference signal generator 13.

A block diagram of a specific configuration of the reference signal generator 13 is shown in FIG. 3. The reference signal generator 13 includes a D-type flip-flop 88 with a clock input terminal C supplied with the reference clock signal 4fH and a data input terminal supplied with the vertical sync signal VS. The output Q of the flip-flop 88 is applied from an inverter circuit 89 to the clock input terminal of the next-stage D-type flip-flop 90. The data input terminal D of the flip-flop 90 is held at high level by a resistor 91. The reference clock signal 4fH from line 87 resets the flip-flop 90. The output Q of the flip-flop 90 is led out as a reference signal VR. In this way, the reference signal generator 13 converts the vertical sync signal VS into a signal synchronous with the reference clock signal 4fH at the first-stage D-type flip-flop 88, and through the next-stage flip-flop 90, generates the reference signal VR having a pulse width one half that of the reference clock signal 4fH.

The first discrimination signal generator includes a first frequency divider 14 and a first window circuit 15. The first frequency divider 14 counts the reference clock signal 4fH and outputs a first window pulse W1S at the count of 1049 (262.25 H) and a sync output pulse PC which is a standard period signal at the count 1050 (262.5 H). The sync output pulse PC is used as a timing control signal for generating a count-down vertical sync signal CVD of the standard period. The first window circuit 15 counts the reference clock signal 4fH in response to the first window pulse W1S and outputs a first window signal W1 having a pulse width of ±0.25 H around the standard period of 262.5 H. The first window signal W1 functions as a phase discriminating scaler for determining whether the period of the reference signal VR is included in the range of 0.5 H.

Figure 4:
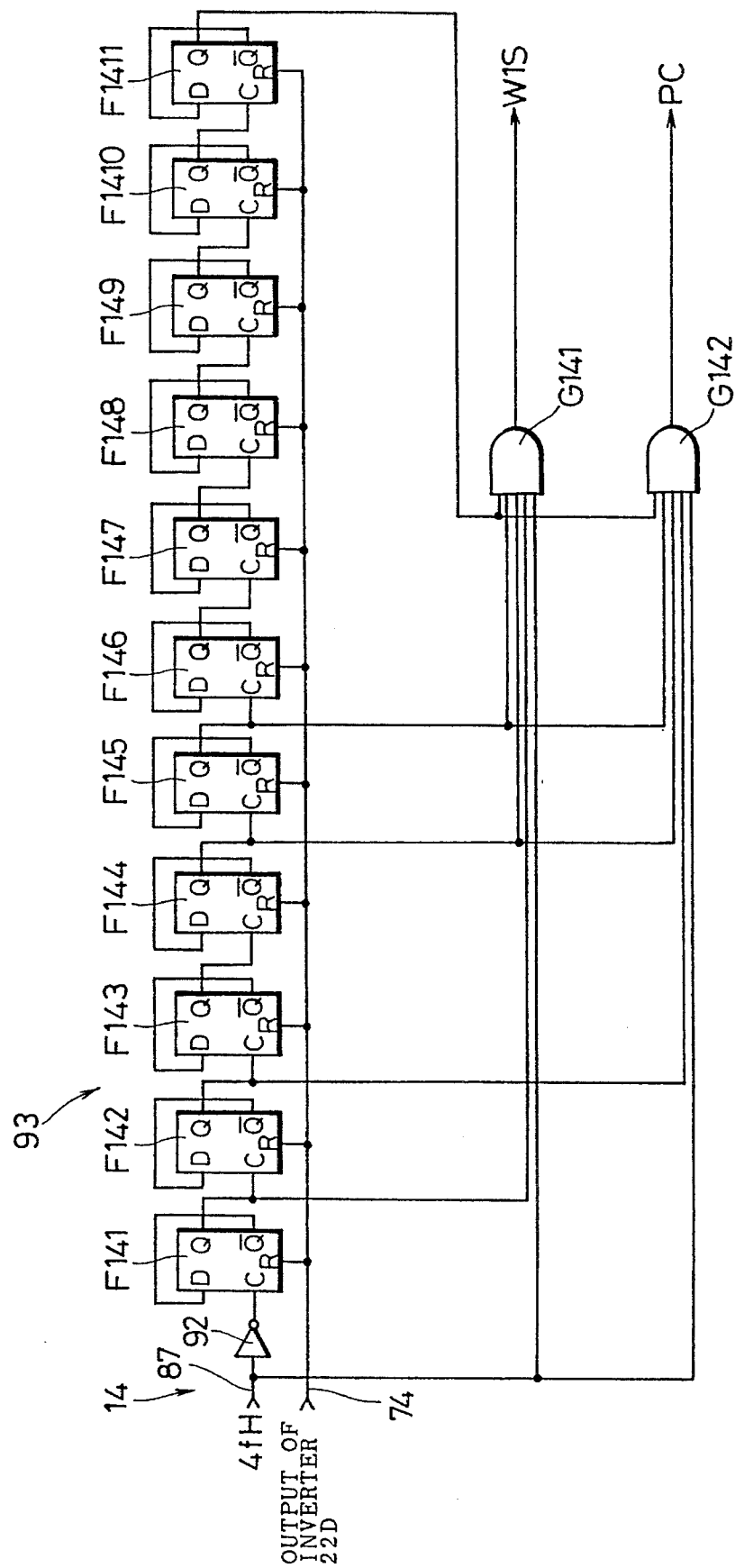
FIG. 4 is a block diagram showing a specific configuration of a first frequency divider 14.

A block diagram of a specific configuration of the first frequency divider 14 is shown in FIG. 4. The reference clock signal 4fH is inverted at an inverter circuit 92, and applied to a frequency divider 93 including a total of 11 stages of D-type flip-flops F141 to F1411. These flip-flops F141 to F1411 are reset by the output of the inverter 22d supplied through line 74. The first window pulse W1S is obtained from an AND gate G141, which is supplied with the output of the first-, fourth-, fifth- and 11th-stage flip-flops F141, F144, F145 and F1411 and the reference clock signal 4fH. The AND gate G142 for producing the sync output pulse PC is supplied with the reference clock signal 4 fH and the output of the second-, fourth-, fifth- and 11th-stage flip-flops F141, F144, F145 and F1411. In this way, the first window pulse W1S and the sync output pulse PC having the required timing are generated by the two AND gates G141 and G142.

Figure 5:
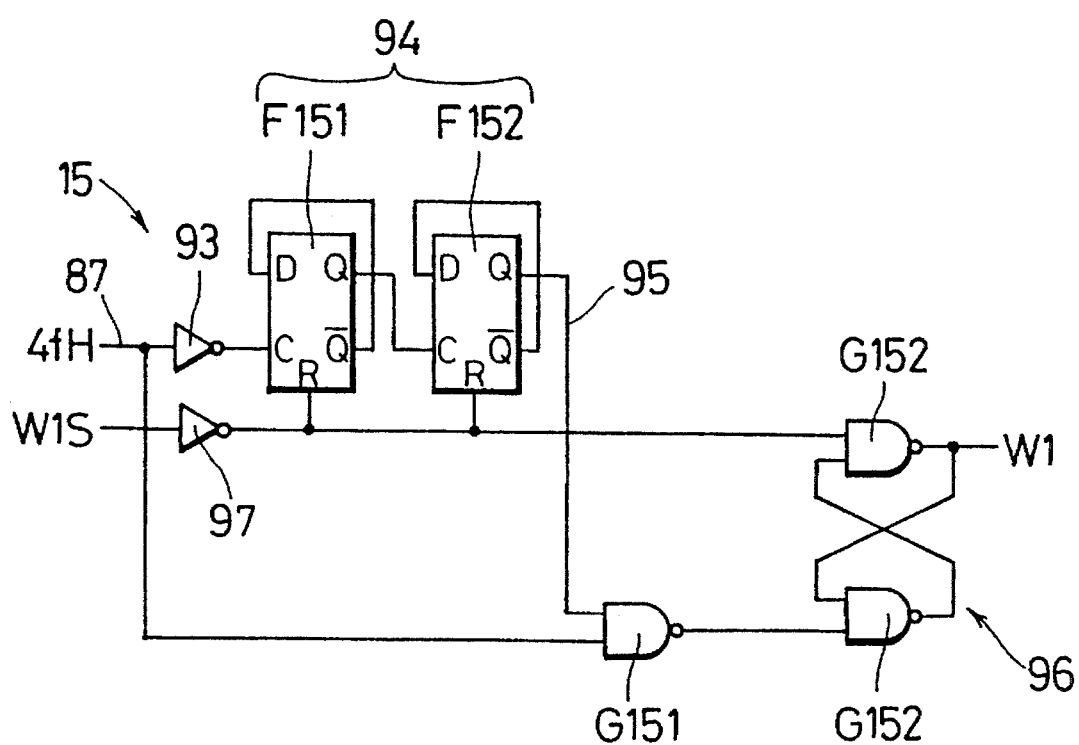
FIG. 5 is a block diagram showing a specific configuration of a first window circuit 15.

A block diagram of a specific configuration of the first window circuit 15 is shown in FIG. 5. The reference clock signal 4fH produced through line 87 is applied through an inverter 93 to a frequency divider 94 including D-type flip-flops F151 and F152. The signal frequency-divided by $2^2$ in this way and led from the second-stage flip-flop F152 to line 95 is applied to a NAND gate G151, which in turn is supplied with the reference clock signal 4fH. A latch circuit 96 includes NAND gates G152 and G153. The first window pulse W1S is used to reset the flip-flops F151 and F152 through the inverter 97 and further applied to the NAND gate G152 of the latch circuit 96. The output of the NAND gate G151 is applied to the NAND gate G153. The output of the latch circuit 96 is led out as the first window signal W1. When the inverted pulse of the first window pulse W1S falls in this way, the first window signal W1 rises to high level, after which the first window signal W1 falls to low level with the fall of the output of the NAND gate G151. The first window pulse W1 having a small pulse width is thus generated. More specifically, the frequency divider 94 reset by the first window pulse W1S produces the first window signal W1 by activating the latch circuit 96 using the reference clock signal 4fH divided by four and the first window pulse W1S.

The second discrimination signal generator includes a second frequency divider 16 and a second window circuit 17. The second frequency divider 16 counts the reference clock signal 4fH and outputs a second window pulse W2S at, say, 230.5 H providing the starting point of a predetermined pulse width larger than the first window pulse W1. This constitutes the timing smaller by 32 H than the standard period of 262.5 H. The second window circuit 17 counts the reference clock signal 4fH up to 294.5 H in response to the second window pulse W2S, and outputs the second window signal W2 having a width of ±32 H around the standard period. The second window signal W2 having a width of 64 H functions as a phase-discriminating scaler for deciding whether the reference signal VR is included in the width range. The period of ±32 H is set in view of the fact that 32 is a power of 2 and the width of 64 H provides a necessary and sufficient non-standard period in the range of 230.5 H (68.3 Hz) to 294.5 H (53.4 Hz). In spite of this, a period other than ±32 H can be employed.

Figure 6:
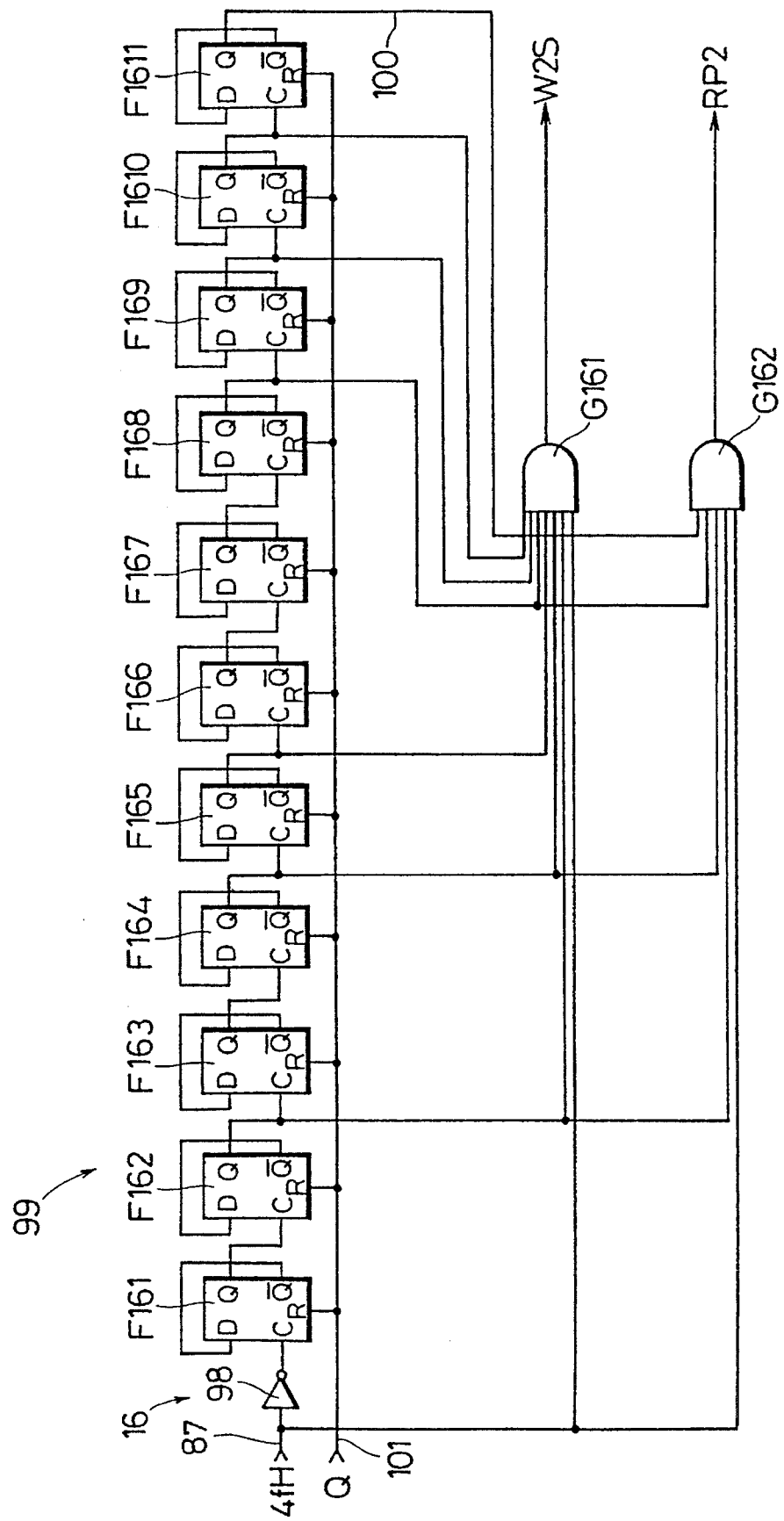
FIG. 6 is a block diagram showing a specific configuration of a second frequency divider 16.

A block diagram of a specific configuration of the second frequency divider 16 is shown in FIG. 6. The reference clock signal 4fH is inverted by an inverter 98, and applied to and frequency-divided by a frequency divider 99 including a total of 11-stage D-type flip-flops F161 to F1611. The reference clock signal 4fH frequency-divided by $2^{11}$ is produced to line 100 from the last-stage flip-flop F1611. An AND gate G161 is for producing a second window pulse W2S, thereby producing the reference clock signal 4fH, the outputs of the flip-flops F162, F164, F165 and F168 to F1611, and the second window pulse W2S of 230.5 H described later. The self-reset pulse RP2 is produced from the AND gate G162. This AND gate G162 is supplied with the reference clock signal 4fH and the outputs from the flip-flops F162, F164, F168 and F1611. The signal Q obtained from the self-reset signal RP2 through the gate 21a of the self-reset circuit 21 resets the flip-flops F161 to F1611 of the frequency divider 99 through line 101. The configuration of the second frequency divider 16 is similar to that of the first frequency divider 14, although each stage of the frequency divider 99 coupled to the AND gates G161, G162 is different from the first frequency divider 14 shown in FIG. 4.

Figure 7:
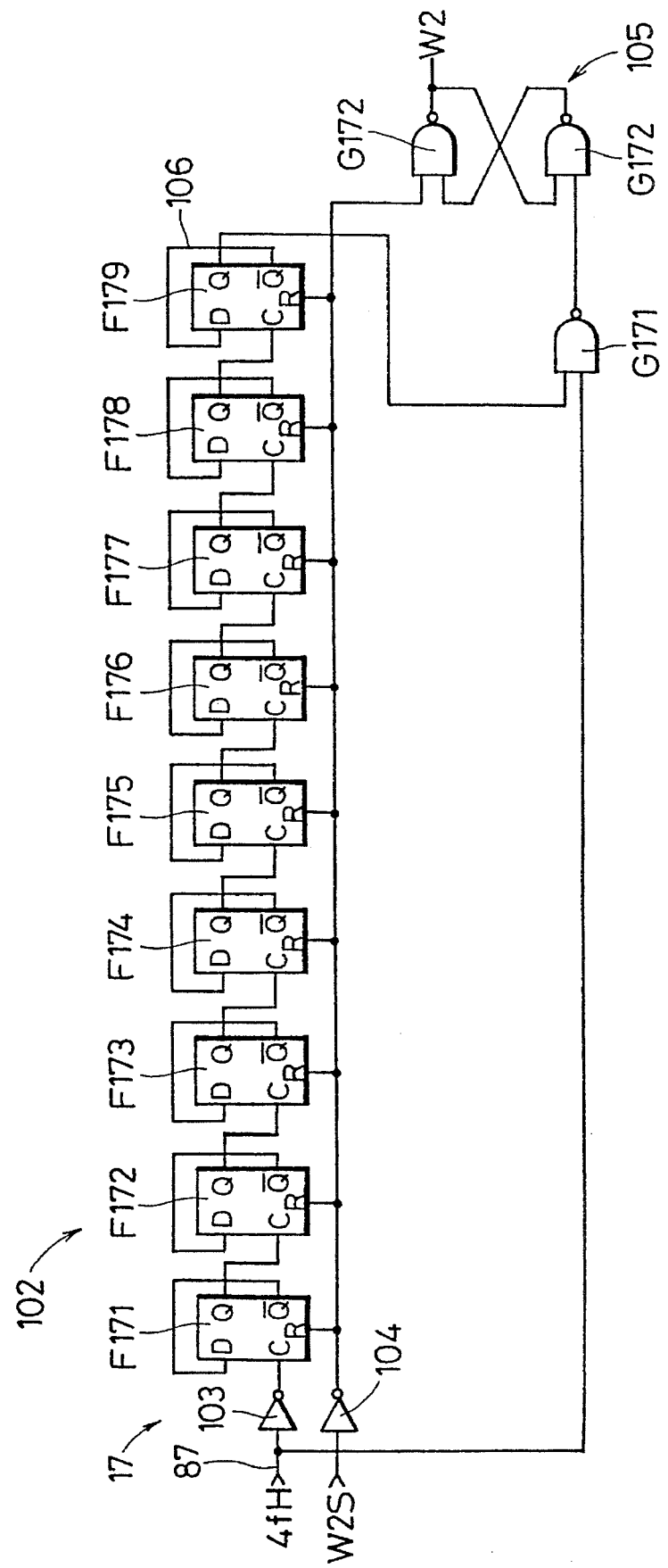
FIG. 7 is a block diagram showing a specific configuration of a second window circuit 17.

A block diagram of a specific configuration of the second window circuit 17 is shown in FIG. 7. The reference clock signal 4fH is applied to the first stage of the flip-flops F171 to F179 of a frequency divider 102 from line 87 through an inverter 103. The second window pulse W2S resets the flip-flops F171 to F179 through the inverter 104, while at the same time being applied to the NAND gate G172 of a latch circuit 105. The signal led out to line 106 from the last-stage flip-flop F179 of the frequency divider 102 is applied to the NAND gate G172 together with the reference clock signal 4fH from line 87. The output of the NAND gate G172 is applied to another NAND gate G172 constituting the latch circuit 105.

In this way, the second window circuit 17 generates a second window signal W2 which is formed by a signal frequency-divided by 512 (=$2^9$) by a second window pulse W2S and the reference clock signal 4fH. When the second window pulse W2S falls, the second window signal W2 rises to a high level. Subsequently, when the frequency-divided output from line 106 is generated from the NAND gate G171 as a fall waveform through the NAND gate G171, the second window signal W2 falls to a low level.

A block diagram of a specific configuration of the mode switching circuit 18 is shown in FIG. 8. This mode switching circuit 18 includes a JK flip-flop F181. The output of the flip-flip F181 is applied to the clock input terminal C by the mode switching signal PM, while the JK input terminal is held at a high level by a resistor 107. The output of the inverter circuit 22c resets the flip-flop F181 through line 72. In this way, the output switching signal MD led out to line 108 from the output Q of the flip-flop F181 is inverted in state each time the mode switching signal PM is input thereto. Each time the mode switching signal PM is input, the polarity of the output switching signal MD is thus switched by the flip-flop F181. Also, upon application of the output of the inverter circuit 22c through line 72 as a reset pulse, the polarity of the output switching signal MD is forcibly reduced to a low level and a standard period mode results. This output switching signal MD is at a high level in a non-standard period mode results.

Waveforms for explaining the operation of the mode switching circuit 18 of FIG. 8 are shown in FIGS. 9(1)–9(3). As shown in FIG. 9(1), the application of the mode switching signal PM inverts the level of the output switching signal MD as shown in FIG. 9(3). Also, the reset signal from the inverter circuit 22c is applied as shown in FIG. 9(2), thereby forcibly reducing the output switching signal MD to a low level.

Waveforms for explaining the operation of the mode switching circuit 18 are shown in FIGS. 10(1)–10(3). The mode switching signal PM is shown in FIGS. 10(1)–10(3). When the reset signal for the inverter circuit 22c remains at a low level as shown in FIG. 10(2), the output switching signal MD is such that the mode switching signal PM is switched by being reversed in polarity as shown in FIG. 10(3).

A block diagram of a specific configuration of the output switching circuit 19 is shown in FIG. 11. The reference clock signal 4fH is applied from line 87 through an inverter circuit 110 to a frequency divider 111 including D-type flip-flops F191 to F195.

In the output switching circuit 19, the output switching signal MD applied through line 108 activates one of the AND gates G191 and G192. In a standard mode, when the output switching signal MD is at a low level, the AND gate G191 becomes active, so that the standard sync signal PC is applied through the AND Rate G191, a NOR gate G193 and line 112 to a NOR gate G194 which is one of the NOR gates of a latch circuit 113. In this way, at the fall of the waveform of the NOR gate G193, the count-down vertical sync signal CVD led out to line 114 from the NAND gate G194 of the latch circuit 113 falls. More specifically, in the standard mode, the count-down vertical sync signal CVD is obtained using the standard sync signal PC.

In a non-standard mode, on the other hand, the output switching signal MD is at a high level, and therefore the AND gate G192 is activated. As a result, the output of the OR gate 22b is applied from line 71 through the AND gate G192 and further from the NOR gate G193 through line 112 to the latch circuit 113, thereby producing the count-down vertical sync signal CVD. The reference clock signal 4fH and the output of the last-stage flip-flop F195 are applied to the NAND gate G196, the output of which in turn is applied to the other NAND gate G195 of the latch circuit 113.

The output of the NOR gate G193 is led out as a pulse PR1. As described above, the reference clock signal 4fH is frequency-divided by a factor of 32 (=$2^5$) with the standard sync signal PC or the output of the OR gate 22b as a reset pulse according to the polarity of the output switching signal MD, so that the count-down vertical sync signal CVD is produced by the latch circuit 113. In the standard period mode, the output switching signal MD is at a low level. Therefore, the standard sync signal PC becomes valid, while in the non-standard mode, the output switching signal MD is at a high level and therefore the output of the OR gate 22b is valid.

Figure 12:
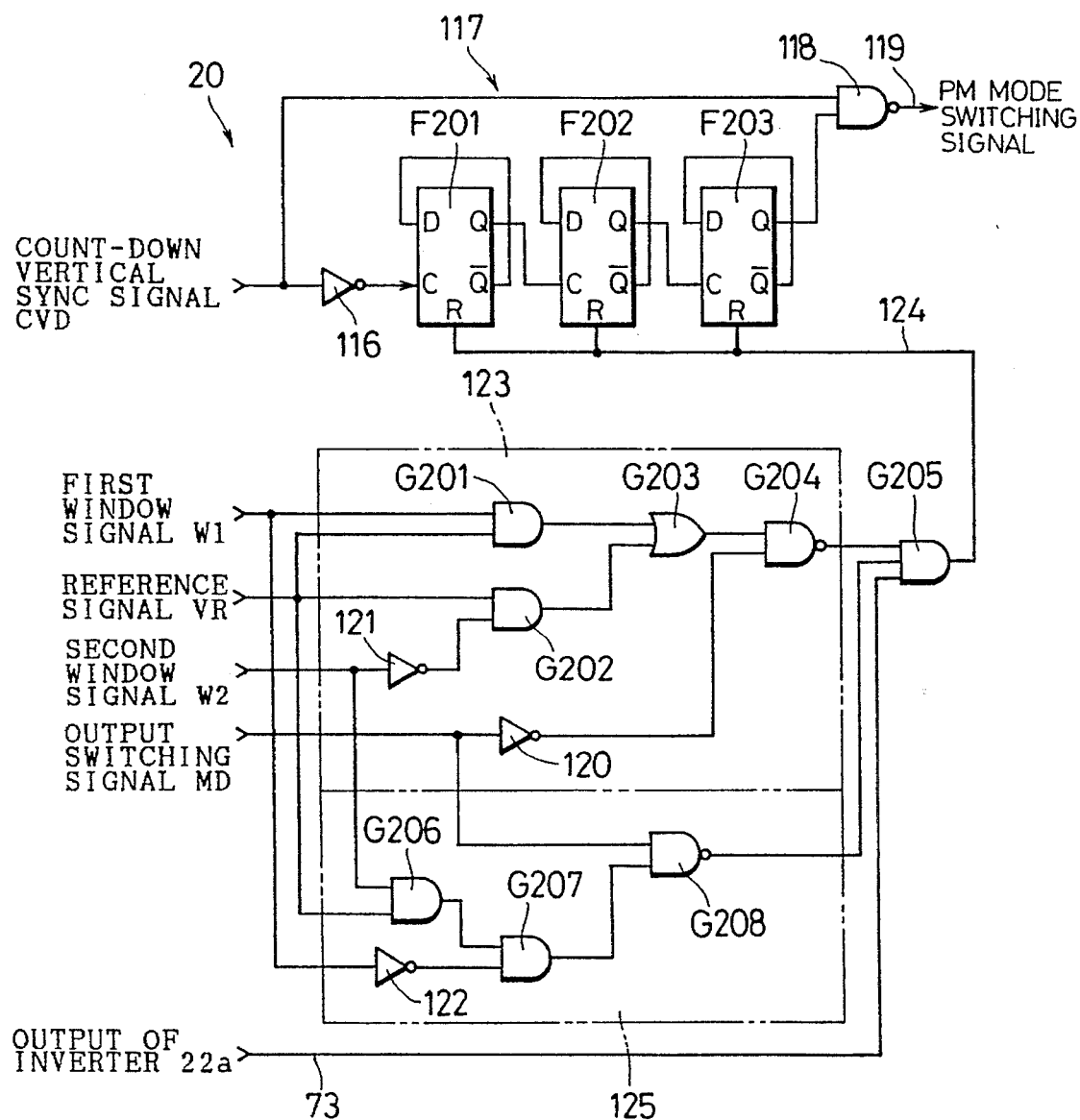
FIG. 12 is a block diagram showing a specific configuration of a third frequency divider 20.

A block diagram of a specific configuration of a third frequency divider 20 is shown in FIG. 12. The count-down vertical sync signal CVD is applied from line 108 through an inverter circuit 116 to a frequency divider 117 including three D-type flip-flops F201 to F203. The count-down vertical sync signal CVD and the output Q of the last-state flip-flop F203 of the frequency divider 117 are applied to a NAND gate 118, and further the mode switching signal led through line 119 to a mode switching circuit 18. This mode switching signal PM has the same pulse width as the count-down vertical sync signal CVD and is output as a signal frequency-divided by $2^3$.

In the standard mode, the output switching signal MD is at a low level, whereby the NAND gate G204 is activated. The other NAND gate G208 becomes non-active and closed. A circuit unit 123 is for applying a reset signal to the flip-flops F201 to F203 of the frequency divider 117 from line 124 through the AND gate G205 in standard mode, i.e., when the output switching signal MD is at a low level.

In the case where the reference signal VR is included in the period of the first window signal W1 in standard mode, i.e., when a composite video signal providing a standard of a predetermined TV system is received, a high-level signal is produced through an AND gate G201 and an OR gate G203, and a reset signal is led from line 124 through the NAND gate G204 and the AND gate G205. The flip-flops F201 to F203 remain reset, and the frequency divider 117 performs no counting operation. In the case where the reference signal VR is not included in the period of the second window signal W2, a high-level signal is also produced through the AND gate G202 and the OR gate G203, so that the frequency divider 117 is reset, thus preventing the counting operation from being performed.

In the non-standard mode, on the other hand, the output switching signal MD rises to a high level. In the case where the reference signal VR is not included in the period of the first window signal W1 but included in the period of the second window signal W2, then a high-level signal is produced from the AND gate G207 by the operation of the inverter circuit 122 and the AND gates G206, G207 in the circuit unit 125. A high-level signal is thus produced through the NAND gate G208 and the AND gate G205 by the operation of the circuit unit 125, so that the frequency divider 117 remains reset. As a result, when the non-standard composite video signal is input, the frequency divider 117 performs no counting operation.

In the case where the standard composite video signal is input in the standard mode, or the non-standard composite video signal is input in the non-standard mode, the mode switching signal PM is not produced, and the particular operation mode is maintained. In the case where the non-standard composite video signal is input in the standard mode, or the standard composite video signal is input in the non-standard mode, in contrast, the count-down vertical sync signal CVD is counted by the frequency divider 117. After the count-down vertical sync signal reaches count four, the operation mode is switched with the mode switching signal PM synchronized from line 119.

The sync signal output means includes a mode switching circuit 18, an output switching circuit 19, a third frequency divider 20 and a self-reset circuit 21. The mode switching circuit 18 outputs a high-level signal in the standard mode and a low-level output switching signal MD in the non-standard mode respectively to the output switching circuit 19 and the third frequency divider 20 in order to set the standard or non-standard mode. In response to the mode switching signal PM from the third frequency divider 20, the level of the output switching signal MD is switched. When the self-reset signal RP2 is input from the second frequency divider 16 through the inverter 22c, on the other hand, the output switching signal MD changes to a high level.

The output switching circuit 19 selects the sync output pulse PC from the first frequency divider 14 and outputs the count-down vertical sync signal CVD in synchronism with the standard period when the output switching signal MD input from the mode switching circuit 18 is at a high level. When the output switching signal MD is at a low level, in contrast, the reference signal VR input from the reference signal generator 13 through the NOR gate 22b is selected and the count-down vertical sync signal CVD is output due to the non-standard period based on the reference signal VR.

In this way, the count-down vertical sync signal CVD due to standard or non-standard period output is applied to the vertical deflection circuit 56 for vertical scanning on the one hand and applied to the third frequency divider 20 as a clock signal on the other hand. Also, when the countdown vertical sync signal CVD is produced by the sync output pulse PC of the standard period, the reset pulse RP1 is output to the first frequency divider 14 at the fall of the sync output pulse PC.

The third frequency divider 20 is a circuit for counting the count-down vertical sync signal CVD as a clock signal. The first window signal W1, the second window signal W2, the reference signal VR and the output switching signal MD are compared with each other. In the case where the output switching signal MD is at a high level with the reference signal VR included in the range of the first window signal W1 providing the standard period, or in the case where the output switching signal MD is at a low level with the reference signal VR not included in the range of the first window signal W1 but included in the range of the second window signal W2 providing the non-standard period, then the third frequency divider 20 is reset at the fall of the reference signal VR.

The output of the inverter circuit 22a (FIG. 1) is applied through line 73 to the AND gate G205.

Also, in the absence of the reference signal VR due to the drop-off of the vertical sync signal VS, for example, as described later, the third frequency divider 20 is reset by the self-reset signal RP2 from the second frequency divider 16. In the case where the third frequency divider 20 fails to be reset, in contrast, the count-down vertical sync signal is counted by four, after which the mode switching signal FM is output to invert the level of the output switching signal MD produced from the mode switching circuit 18. The count four is for setting what is referred to as "the recovery time". The mode switching signal PM is not output if the reference signal VR is restored during this period of count four.

The self-reset circuit 21 includes an AND gate 21a and a NOR gate 21b. In the absence of the reference signal VR during the period of the second window signal W2 due to the drop-off of the sync signal or for other reasons, a decision signal Q is applied to the second frequency divider 16. The second frequency divider 16 applies the self-reset signal RP2 to the third frequency divider 18, the mode switching signal 19 and the output switching circuit 20 at the trailing end of the pulse width of the second window signal W2 in response to the decision signal Q. Next, the operation of an embodiment configured as described above will be explained below.

Figure 13:
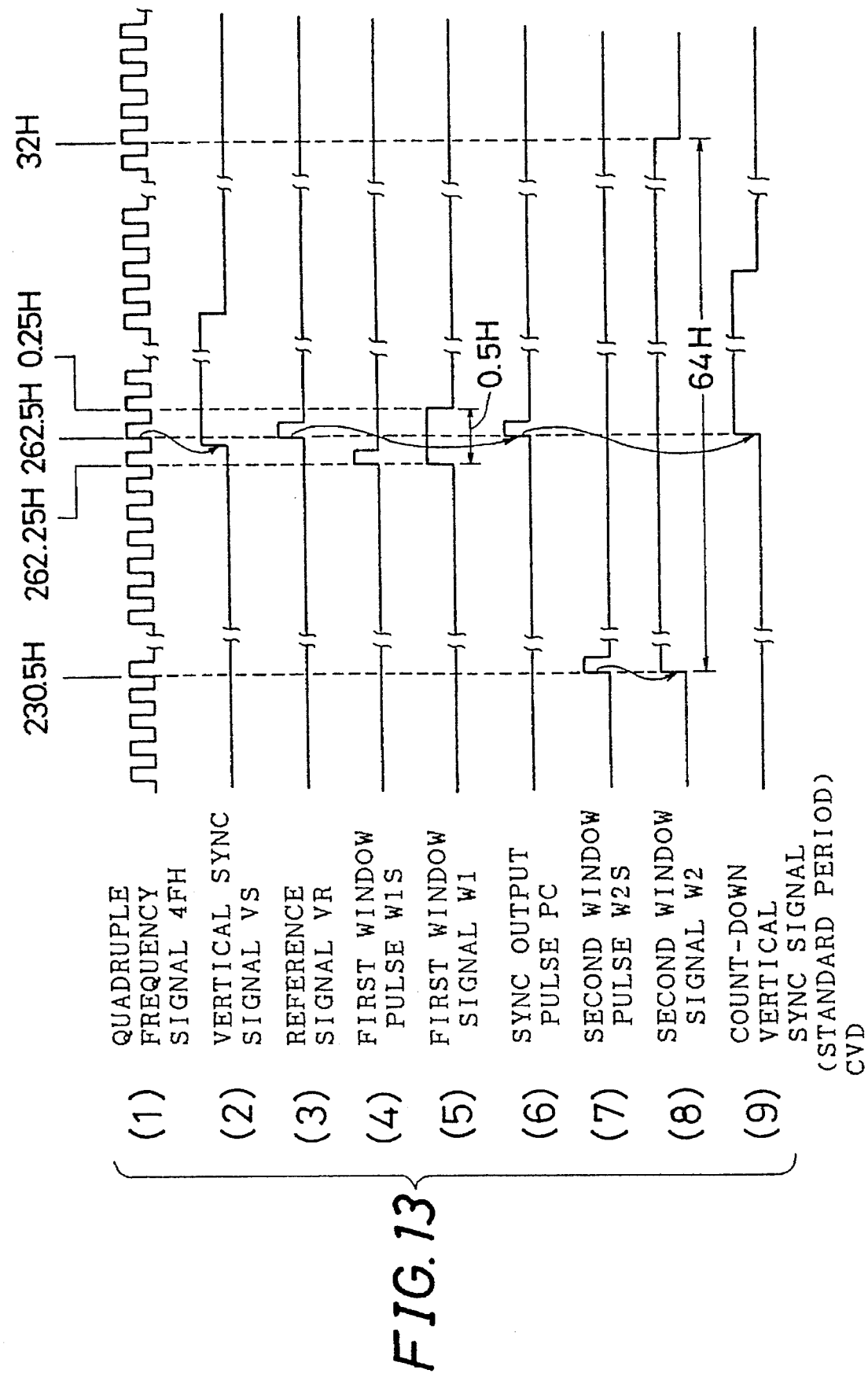
FIGS. 13(1)–(9) are timing charts showing the operation of various parts during the standard period of the vertical sync circuit shown in FIG. 1.

FIGS. 13(1)–13(9) and 14(1)–14(9) are timing charts representing the operation of various parts of the vertical sync circuit 11. Specifically, FIGS. 13(1)–13(9) are diagrams for explaining the operation during the standard period of the vertical sync signal VS, and FIGS. 14(1)–14(9) explains the operation during the non-standard period thereof. First, explanation will be made about the operation of inputting the vertical sync signal due to standard period with reference to FIGS. 13(1)–13(9).

Also referring to FIG. 1, it is assumed that a high-level output switching signal MD is output from the mode switching circuit 19. FIG. 13(1) represents a reference clock signal 4fH with each pulse thereof corresponding to 0.25 H generated by a frequency N-fold multiplier 12. FIG. 13(2) shows a vertical sync signal VS input in the neighborhood of the reference clock signal 4fH of 262.5 H. FIG. 13(3) shows a reference signal VR. The reference signal VR, as described above, is a pulse which is output at the rise timing of the reference clock signal 4fH immediately after the rise of the vertical sync signal VS, and is plotted at the position of the standard period of 262.5 H in FIGS. 13(1)–13(9).

FIG. 13(4) shows the first window pulse W1S output from the first frequency divider 14. The first window pulse W1S is for setting the width of ±0.25 H around the standard period of 262.5 H, and is output at 262.25 H which is the count 1049 of the reference clock signal 4fH. The first window circuit 15 generates the first window signal W1 of 0.5 H in width as shown in FIG. 13(5) in response to the first timing control signal W1S and applies the same signal to the third frequency divider 20. This first window signal W1 and the reference signal VR are compared with each other to determine the period of the vertical sync signal VS. The first frequency divider 14 then applies the sync output pulse PC shown in FIG. 13(6) to the output switching circuit 19 at 262.5 H corresponding to the count 1050.

As shown in FIGS. 13(3) and 13(5), during the standard period, the reference signal VR is included in the range of the first window signal W1. Therefore, the third frequency divider 20 fails to produce the mode switching signal PM and the output switching signal MD remains unchanged at a high level. As a result, the output switching circuit 19 outputs the count-down vertical sync signal CVD having a predetermined pulse width shown in FIG. 13(9) in response to the sync output pulse PC of the standard period while at the same time applying the reset pulse RP1 through the inverter 22d to the first frequency divider 14. As a consequence, the counting operation of the first frequency divider 14 is reset to resume the counting of the reference clock signal 4fH. Also, both the second frequency divider 16 and the third frequency divider 20 are reset at the fall of the reference signal VR. The count-down vertical sync signal CVD is applied to the vertical deflection circuit 56 as described above to perform the vertical scanning operation with the standard period. The count-down vertical sync signal CVD is applied also to the third frequency divider 20 as a clock signal.

The second window pulse W2S output from the second frequency divider 16 is shown in FIG. 13(7). The second window pulse W2S is applied to the second window circuit 17 at the timing of 230.25 H corresponding to count 921 of the reference clock signal 4fH. The second window circuit 17 counts the reference clock signal 4fH in response to the second timing pulse W2S and generates the second window signal W2 of 64 H in width shown in FIG. 13(8). This second window signal W2 sets the range of non-standard period of 230.25 H to 294.25 H, so that the non-standard period is determined if the reference signal VR exists in the portion other than the range of the first window signal W1.

Even in the case where a temporary jitter occurs in the vertical sync signal VS for some reason or other and the reference signal VR deviates from the range of the first window signal W1, the third frequency divider 20 continues to count the count-down vertical sync signal CVD. The third frequency divider 20 is reset if the reference signal VR is restored within count four of recovery time, in which case the mode switching signal PM is not produced and the output switching signal MD remains unchanged at a high level. The operating condition due to the standard period is thus maintained. Also, in the case where the sync signal drops off and the reference signal VR is not output, the circuit is reset by the self-reset pulse RP2 output from the second frequency divider 16 at the trailing end of the second window signal W2 as described above, and therefore the output switching signal MD is held high. As a result, as long as the vertical sync signal VS due to the standard period is input, the count-down sync signal CVD is generated in a stable manner even against a temporary phase shift.

In contrast, where the reference signal VR deviates from the first window signal W1 and is included in the range of the second window signal W2 so that the range of the non-standard period is involved even after count four of the count-down vertical sync signal CVD, the third frequency divider 20 outputs the mode switching signal PM, and the mode switching circuit 18 inverts the level of the output switching signal MD to a low level. Consequently, the output switching circuit 19 is switched to the non-standard period mode, thereby producing the count-down vertical sync signal CVD based on the reference signal VR.

Next, the operation of inputting the vertical sync signal due to a non-standard period will be explained with reference to FIGS. 14(1)–14(9). The reference clock signal 4fH shown in FIG. 13(1), the first window pulse W1S, the first window signal W1 and the sync output pulse PC shown in FIGS. 14(4) to 14(6) are identical to those shown in FIGS. 13(1) and 13(4) to 13(6), respectively. The second window pulse W2S shown in FIG. 14(7) and the second window signal W2 shown in FIG. 14(8) are also identical to the corresponding signals shown in FIGS. 14(7) to 14(8), respectively. The non-standard period is set to the width of ±32 H (230.5 H to 294.5 H) around the reference period of 262.5 H. Also, the output switching signal MD is assumed to be at a low level.

Figure 14:
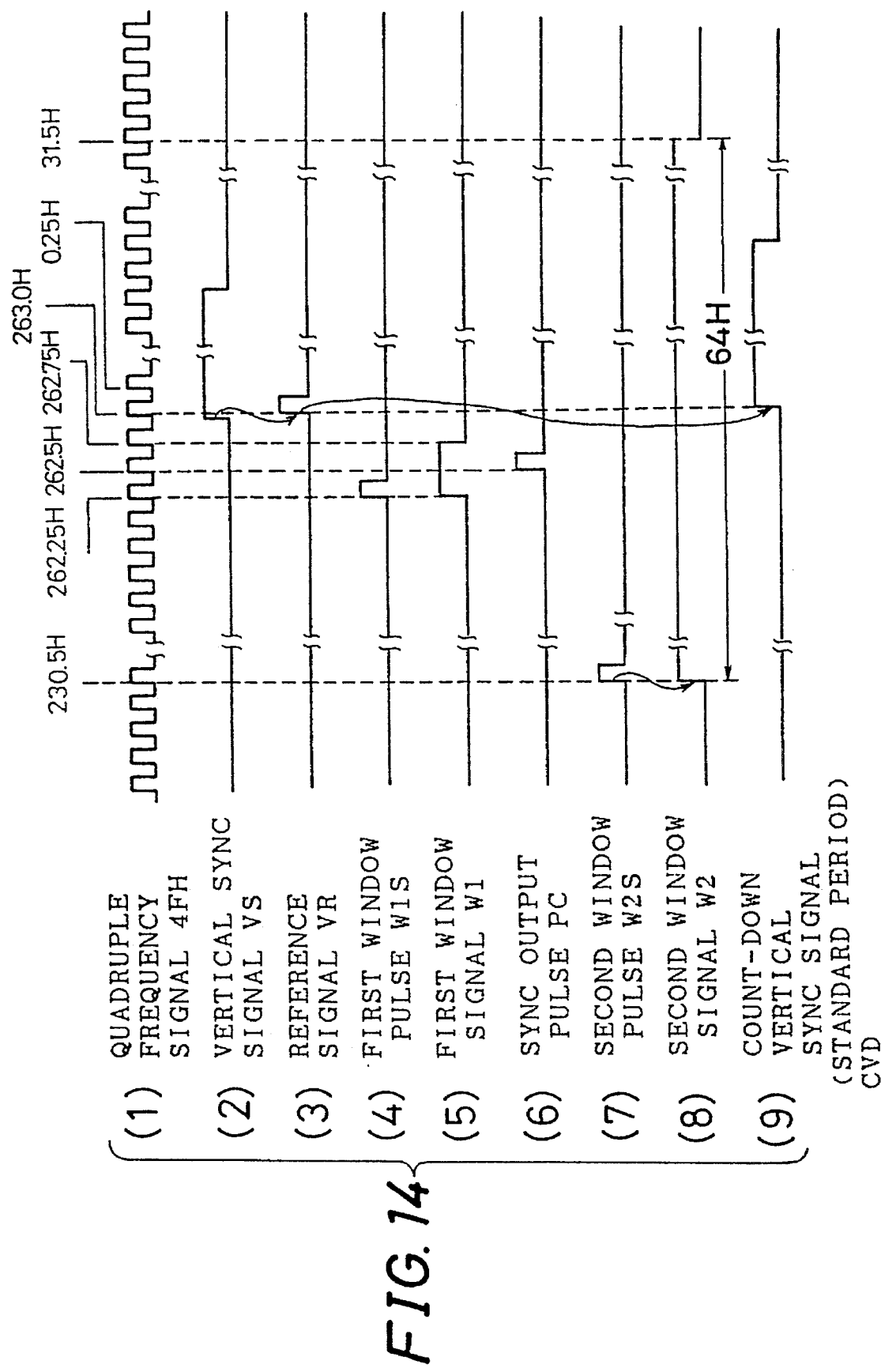
FIGS. 14(1)–(9) are timing charts showing the operation of various parts during the non-standard period of the vertical sync circuit shown in FIG. 1.

A vertical sync signal VS for the non-standard period is shown in FIG. 14(2). The period of the vertical sync signal VS is out of the range of the standard period of 262.5 H. For this reason, the reference signal VR is output at the position of non-standard period of 263.25 H in FIGS. 14(1)–14(9) immediately after the rise of the vertical sync signal VS as shown in FIG. 14(3). The reference signal VR is included in the range of the second window signal W2 out of the range of the first window signal W1. Since the output switching signal MD is at low level, the third frequency divider 20 is reset each time of fall of the reference signal VR of the third frequency divider 20, while the mode switching signal PM is not produced, thus retaining holding the non-standard period mode.

Also, where the vertical sync signal VS of standard period has been input immediately before the input of the vertical sync signal VS of non-standard period, the output switching signal MD remains at a high level. In this case, since the reference signal VR is not in the range of the first window signal W1, the third frequency divider 20 is not reset, but continues counting the count-down vertical sync signal CVD. After counting the count-down vertical sync signal CVD by four, the third frequency divider 20 outputs the mode switching signal PM, and the mode switching circuit 18 reduces the output switching signal MD to a low level, thereby switching into a non-standard period mode. As a result, the output switching circuit 19 thereafter generates the count-down vertical sync signal CVD of a non-standard period on the basis of the reference signal VR.

Further, where the vertical sync signal of a standard period is applied in a non-standard period mode, the third frequency divider 20 is not reset even when the reference signal VR enters the range of the width of the first window signal W1 in view of the fact that the mode switching signal MD thus far was at low level. The third frequency divider 20 thus counts the count-down vertical sync signal CVD by four, and then outputs the mode switching signal PM. The level of the mode switching signal MD output from the mode switching circuit 18 is thus inverted to a high level. The output switching circuit 19 switches the input in response to the output switching signal MD. After that, the count-down vertical sync signal CVD is produced on the basis of the sync output pulse PC input from the first frequency divider 14, thereby attaining the standard period mode.

According to the present embodiment, in the case where the sync signal drops off during the operation in a non-standard mode, a non-signal state is assumed and the circuit is switched to the standard period mode. This is in view of the fact that the non-standard period mode is the state for receiving a signal from the signal source other than broadcasting such as VTR, when a stable sync signal is supplied and no sync signal drop-off is considered to occur unlike during the standard period. In the case where a sync signal drop-off occurs during a non-standard period, the self-reset pulse RP2 is output from the second frequency divider 16 to reset the mode switching circuit 18. The output switching signal MD thus is inverted to a high level, and at the same time the third frequency divider 20 is reset. As a result, the output switching signal MD is maintained at a high level, thereby attaining the standard period mode.

In this way, the vertical sync circuit 11 according to the present embodiment can generate the count-down vertical sync signal CVD which remains stable even against a drop-off of a sync signal when the vertical signal signal VS of standard mode is applied. In the case where a vertical sync signal of a non-standard period is applied, on the other hand, it is possible to generate the count-down vertical sync signal CVD having the same period as the vertical sync signal of standard period.

When a vertical sync signal of a different period is applied during this operation, the circuit is switched in such a manner as to generate the count-down vertical sync signal CVD based on the same period automatically after counting the count-down vertical sync signal CVD for a predetermined time length for decision, i.e, by four. Further, in the case where the sync signal drops off, the count-down vertical sync signal CVD is generated automatically on the basis of the standard period after a predetermined time of decision. As a result, it becomes possible to perform a stable operation at the time of input of the vertical sync signal of standard period and also to generate the count-down vertical sync signal corresponding to the period of the sync signal at the time of input of the vertical sync signal of non-standard period.

Figure 15:
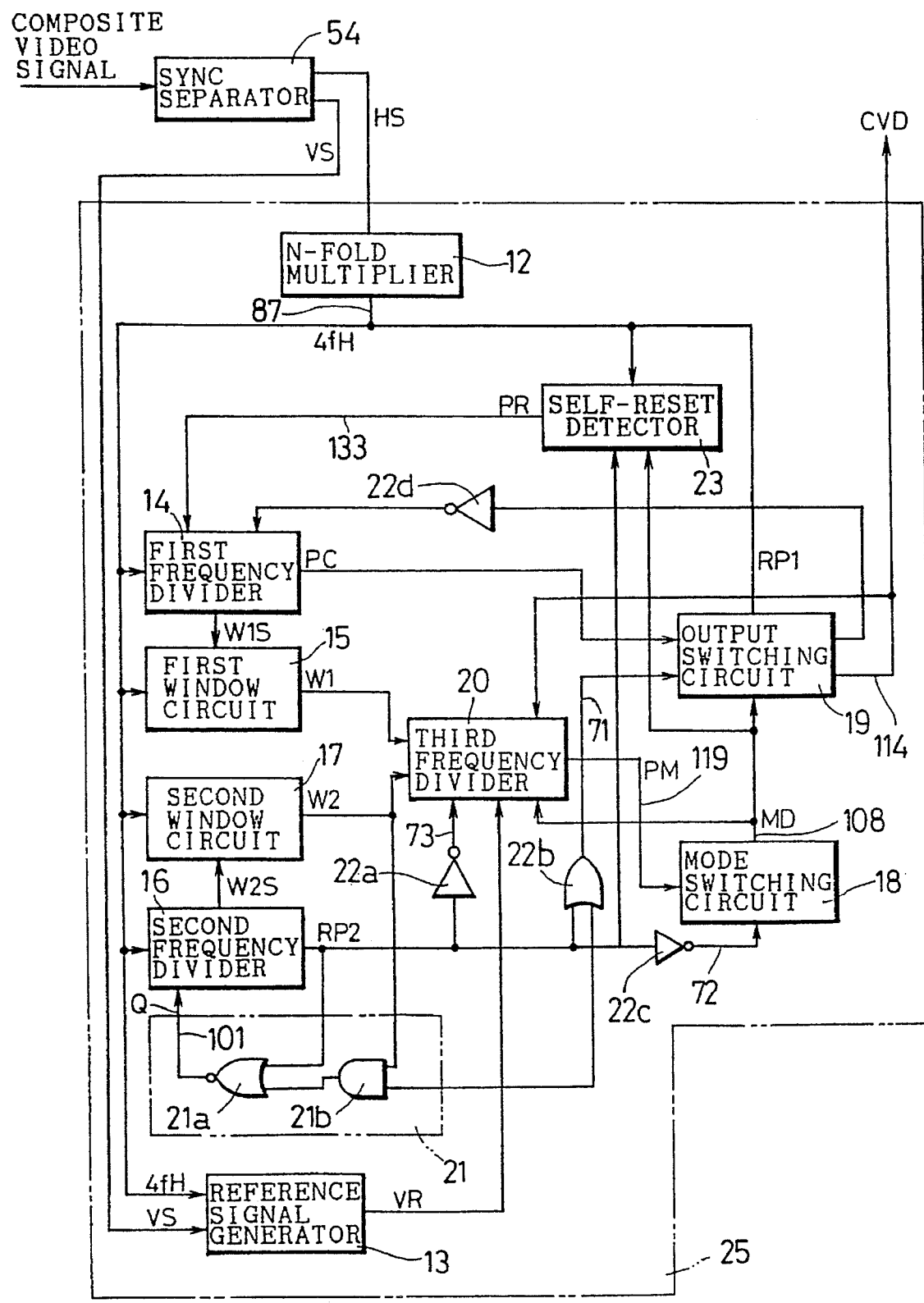
FIG. 15 is a block diagram showing the electrical configuration of the vertical sync circuit according to another embodiment of the invention.

A block diagram of a configuration of the vertical sync circuit 25 according to another embodiment of the invention is shown in FIG. 15. In FIG. 15, the component parts identical to those in FIG. 1 are designated by the same reference numerals as in FIG. 1, respectively and will not be described. It should be noted in this embodiment that a self-reset detector 23 constituting a timing control signal generator is provided for advancing the timing of outputting the standard period signal by a predetermined length of time. As a result, a stable count-down vertical sync signal CVD is generated even in the case of receiving a TV broadcasting signal having a weak electric field intensity while at the same time precluding the appearance of the vertical flyback period on the screen. The self-reset detector 23 is for outputting the timing control signal PR in response to the input self-reset signal RP2 and the output switching signal MD, which timing control signal PR is applied to the first frequency divider 14 to advance the count by 32 H.

Referring to FIGS. 1 to 14, at the time of receiving the TV broadcasting, the vertical sync signal VS of standard period is input and therefore the output switching signal MD is at a high level. When the electric field intensity is very weak, however, the vertical sync signal VS may drop off and the reference signal VR may fail to be output. Also, the noise may be recognized erroneously as a vertical sync signal. In such a case, as described above, the third frequency divider 20 counts the count-down vertical sync signal CVD by four and then outputs the mode switching signal PM. As a consequence, the output switching signal MD is reduced to a low level to switch to the non-standard period mode. In the absence of the reference signal VR in the non-standard period mode, the third frequency divider 20 is reset by the self-reset signal RP2 from the second frequency divider 16.

In view of the fact that the self-reset signal RP2 is output at the trailing end of the pulse width of the second window signal W2, however, the count-down vertical sync signal CVD immediately after resetting is output at the position of 294.5 H, and enters the vertical flyback period delayed by 32 H in phase from the count-down vertical sync signal CVD in standard period mode. At the same time, the output switching signal MD changes to a high level due to the self-reset signal RP2. Therefore, the count-down vertical sync signal CVD of 262.5 H is output subsequently. As a result, the vertical flyback period remains as it is on the display screen, thereby producing the flyback signal on the screen undesirably.

In order to preclude the appearance of the vertical flyback period on the screen, the embodiment shown in FIG. 15 comprises a self-reset detector 23 providing a timing control signal generator. A timing control signal PR based on the self-reset signal RP1 and the output switching signal MD is generated and applied to the first frequency divider 14. The count of the reference clock signal 4fH immediately after resetting is advanced by 32 H, and the count-down vertical sync signal CVD immediately after resetting is output at the timing of 262.5 H. Then, the vertical flyback period disappears, so that the count-down vertical sync signal CVD is subsequently output with the standard period of 262.5 H, thereby preventing the vertical flyback period from remaining on the screen.

Figure 16:
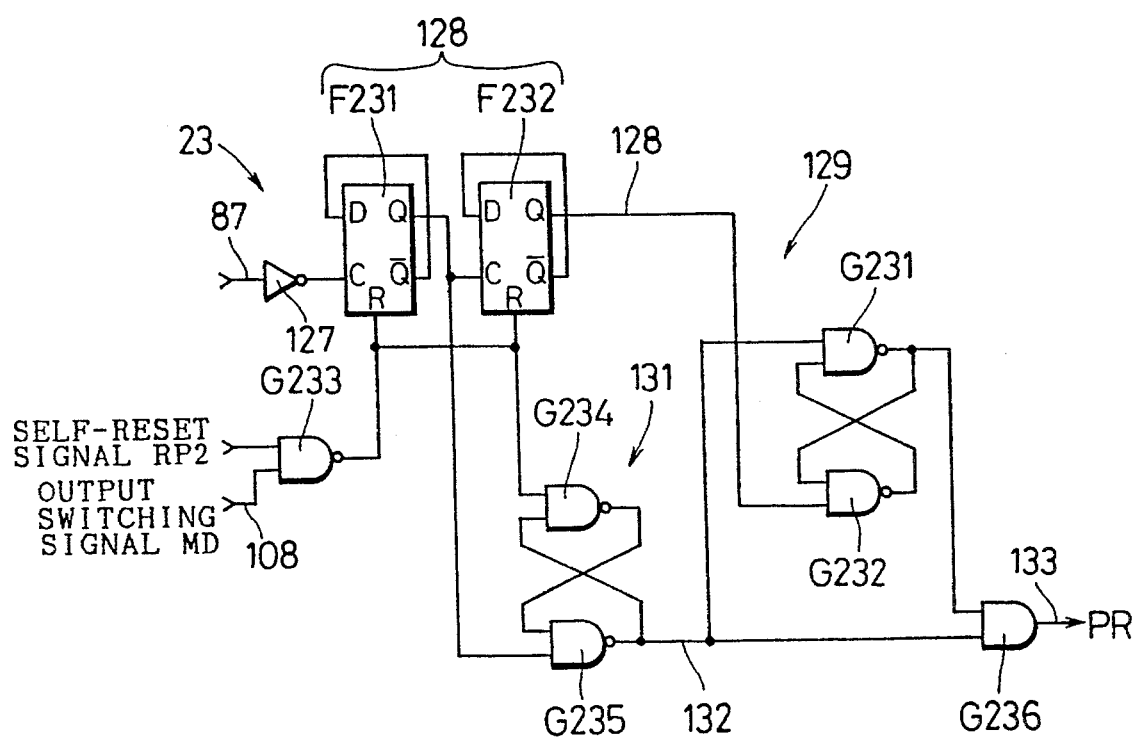
FIG. 16 is a block diagram showing a specific configuration of a self-reset detection circuit 23 according to the embodiment shown in FIG. 15.

A block diagram of a specific configuration of the self-reset detector 23 is shown in FIG. 16. The reference clock signal 4fH is applied from line 87 through an inverter circuit 127 to D-type flip-flops F231 and F232 which constitute a frequency divider 128. The output Q of the last-stage flip-flop F232 of the frequency divider 128 is applied from line 128 to the NAND gate G232 constituting one of a pair of the NAND gates G231 and G232 of a latch circuit 129. The self-reset signal RP2 and the output switching signal MD from the second frequency divider 16 are applied to a NAND gate G233 and are used for resetting the flip-flops F231 and F232 of the frequency divider 128. At the same time, the self-reset signal RP2 and the output switching signal MD are applied to the NAND gate G234 which is one of a pair of the NAND gates G234 and G235 of the other latch circuit 131. The output of the first-stage flip-flop F231 of the frequency divider 128 is applied to the NAND gate G235. The output of the NAND gate G235 is applied to the NAND gate G231 of the latch circuit 129 from line 132 on the one hand and to the AND gate G236 on the other hand. The AND gate G236 is supplied with the output of the NAND gate G231 of the latch circuit 129. The output of the AND gate G236 is produced as a timing control signal PR from line 133.

When the self-reset signal RP2 is output from the second frequency divider 96 in a non-standard mode during the high level of the output switching signal MD in the self-reset detector 23, a timing control signal PR is produced, which is delayed by one pulse of the reference clock signal 4fH with respect to the self-reset signal RP2.

Namely, in a non-standard mode, the output switching signal MD is at a high level, whereby the NAND gate G232 becomes active so that the self-reset signal RP2 is applied from the second frequency divider 16 through the NAND gate G233. The low-level output of the NAND gate G233 thus resets the flip-flops F231 and F232 of the frequency divider 128. As a result, the signal led out from the NAND gate G235 of the latch circuit 131 to line 132 becomes low in level by the falling waveform of the NAND gate G233. Then, upon application of the falling waveform of the flip-flop F231 of the frequency divider 128 to the NAND gate G235 of the latch circuit 131, the output on line 132 is raised to a high level.

When the output led out of line 132 of the latch circuit 131 falls, the signal led out to line 134 from the latch circuit 129 becomes high in level. Subsequently, at the time of fall of the signal led out from the frequency divider 128 through line 128, the output on line 134 is reduced to a low level. In this way, the timing control signal PR is led out as a high-level pulse in a non-standard mode when the self-reset signal RP2 is generated, i.e., when the second frequency divider 16 is reset by itself. This high-level pulse is applied from line 133 to the first frequency divider 14.

Figure 17:
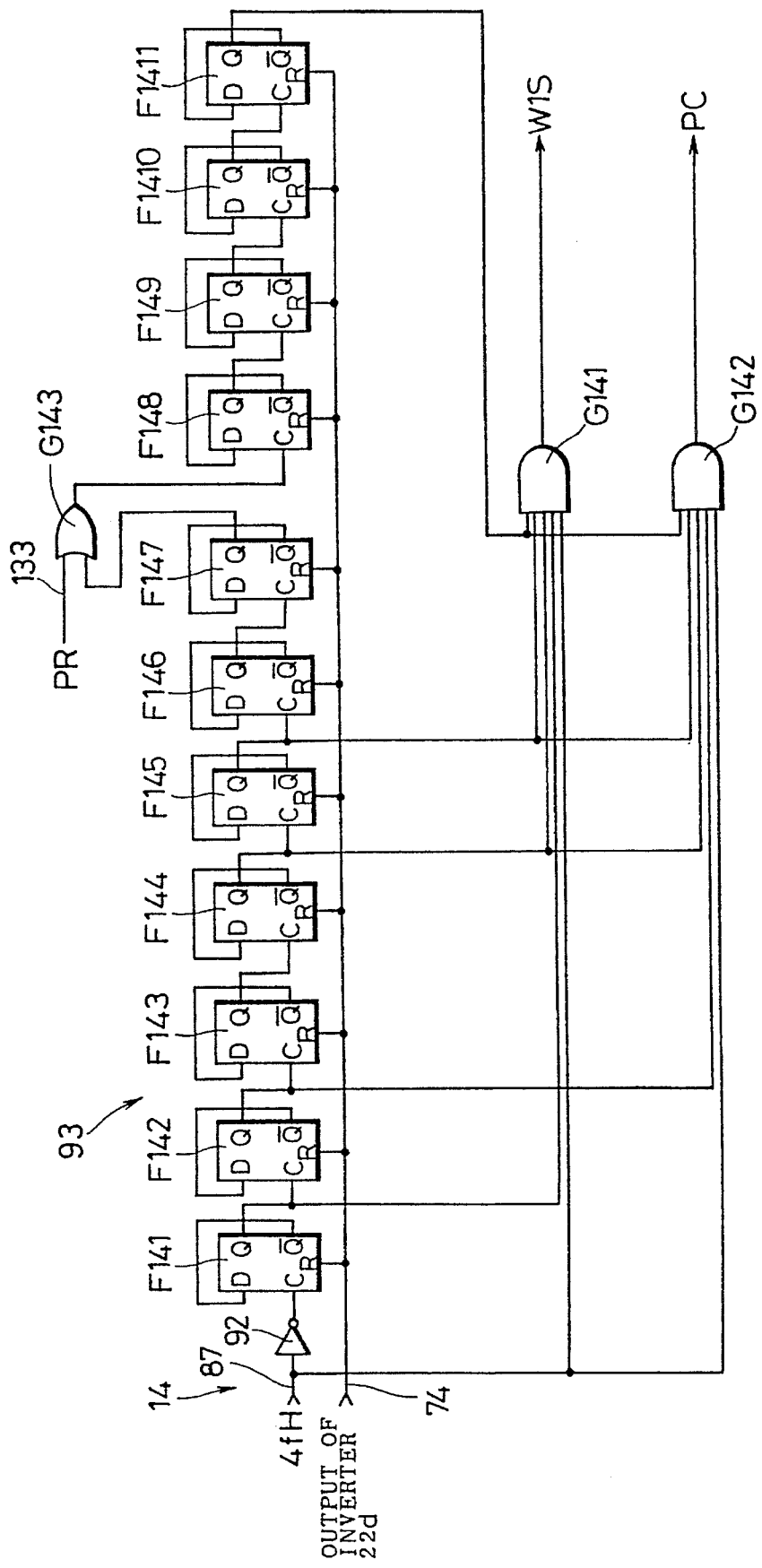
FIG. 17 is a block diagram showing a specific configuration of the first frequency divider 14 according to the embodiment shown in FIGS. 15 and 16.
Figure 18:
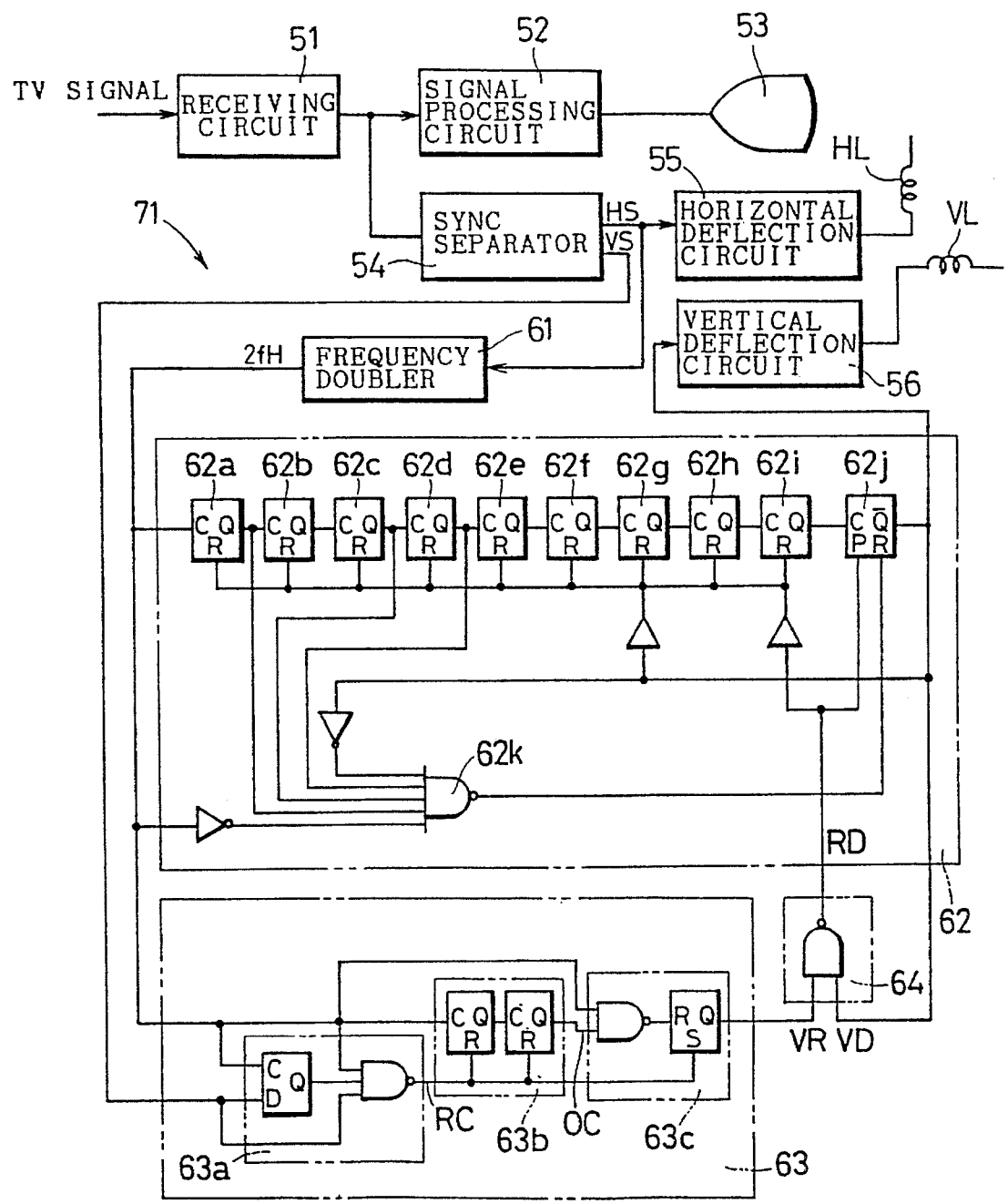
FIG. 18 is a block diagram showing the electrical configuration of a conventional vertical sync circuit.

An electrical circuit making up a specific configuration of the first frequency divider 14 according to the embodiment shown in FIGS. 15 and 16 is shown in FIG. 17. The first frequency divider 14 is similar in configuration to that shown in FIG. 4. In this embodiment, it should be especially noted that the timing control signal RP applied through line 133 is applied, together with the output Q of the seventh-stage flip-flop F147 of the frequency divider 93, to the clock input C of the eighth-stage flip-flop F148 from the OR gate G143. As a consequence, the first window pulse W1S led out of the AND gate G141, as shown in FIGS. 13(4) and 14(4), is produced at 230.5 H faster by 32.25 H than in the embodiments of FIGS. 1 to 14 in which the first window pulse W1S is produced at the timing of 262.25 H. In this way, the output W1S of the first frequency divider 14 can be advanced by 32 H.

Another configuration according to the embodiment shown in FIGS. 15 to 17 is similar to that of the embodiments shown in FIGS. 1 to 14.

It will thus be understood from the foregoing description that according to this embodiment, a stable count-down vertical sync signal is produced even when the electric field intensity is very low. At the same time, a harmful appearance of the vertical flyback period on the screen is prevented. As a result, the invention is applied effectively with reduced screen abnormalities for the equipment such as a liquid crystal TV frequently used outdoor in an area of weak electric field intensity, or a VTR used as a monitor.

The invention is not confined to the numerical values used in the foregoing description. Although according to the embodiment, the standard period is explained as 262.5 H based on the NTSC system, for example, the standard period of 312.5 H (15625/50) is employed in an environment where the PAL or SECAM system is employed. This is also the case with the non-standard period of ±32 H in width and count four of the count-down vertical sync signal CVD. The invention therefore is not limited to the numerical values cited in the embodiment unless the scope of the claim is departed therefrom.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A vertical sync circuit comprising:

means for generating a reference clock signal 4fH having a frequency N times the frequency of a horizontal sync signal extracted from an input TV composite signal, wherein N is a natural number of 2 or more;

means for generating a reference signal VR in synchronism with a vertical sync signal VS extracted from the TV composite signal, on the basis of the vertical sync signal VS and the reference clock signal 4fH;

first discrimination signal generating means for generating and outputting a standard period signal PC having a period equal to that of the vertical sync signal as determined according to a particular TV broadcasting system and a first window signal W1 having a pulse width set in advance before or after the output timing of the standard period signal PC on the basis of the reference clock signal 4fH;

second discrimination signal generating means for generating and outputting a second window signal W2 set in advance with a pulse width greater than the first window signal W1 on the basis of the reference clock signal 4fH; and means for determining which of the first window signal W1 and the second window signal W2 contains the period of the reference signal VR, selecting either of the reference period signal PC or the reference signal VR on the basis of the result of determination, and outputting a sync signal having the same period as the selected signal.

2. A vertical sync circuit according to claim 1, further comprising means for generating a timing control signal PR to advance the timing of outputting the standard period signal PC from the first discrimination signal generating means by a predetermined period.

3. A vertical sync circuit comprising:

a sync separator for producing a horizontal sync signal HS and a vertical sync signal VS from a television composite video signal;

a first means for generating a reference clock signal 4fH having a frequency N times that of the horizontal sync signal HS from the sync separator, wherein N is a natural number of 2 or more;

a second means for generating a reference signal VR in synchronism with the vertical sync signal VS produced from the sync separator on the basis of the reference clock signal 4fH produced from the reference clock signal generator;

a frequency divider for generating a standard period signal PC having a predetermined standard period of the vertical sync signal VS in response to the reference clock signal 4fH;

a third means for generating a first window signal W1 having a pulse width containing the output time point of the standard period signal PC in response to the reference clock signal 4fH;

a circuit for generating a second window signal W2 having a pulse width greater than the first window signal W1 containing the output time point of the standard period signal PC in response to the reference clock signal 4fH;

a fourth means for switching between a standard mode to output the standard period signal PC and a non-standard mode to output the reference signal VR in response to a mode switching signal PM, said means outputting either of the standard period signal PC and the reference signal VR as a vertical sync signal; and a fifth means for producing the mode switching signal PM and providing the fourth means therewith when the reference signal VR is not included in the period of the first window signal W1 but included in the period of the second window signal W2 in the standard mode and also when the reference signal VR is included in the period of the first window signal W1 but not in the period of the second window signal W2 in the non-standard mode, said means failing to produce the mode switching signal PM when the reference signal VR is included in the period of the first window signal W1 but not included in the period of the second window signal W2 in the standard mode and also when the reference signal VR is not included in the period of the first window signal W1 but in the period of the second window signal W2 in the non-standard mode.

4. A vertical sync circuit according to claim 3, wherein:

the reference clock generator generates the reference clock signal 4fH having a predetermined frequency in the absence of the horizontal sync signal HS; and the vertical sync circuit in further provided with:

a sixth means for generating a self-reset pulse RP2 in response to the reference clock signal 4fH when the reference signal VR fails to be generated and with a self-reset detector for producing a timing control signal PR delayed by a predetermined time relative to the self-reset signal RP2 in response to the self-reset signal RP2 in the non-standard mode; and the frequency divider has the function of advancing the timing of outputting the standard period signal PC in response to the timing control signal PR.

5. A vertical sync signal according to claim 4, further comprising a seventh means for advancing the generation of the standard period signal PC by the frequency divider in response to the self-reset signal RP2 in the non-standard mode.

6. A television receiver comprising a vertical sync circuit, the vertical sync circuit including:

a sync separator for producing a horizontal sync signal HS and a vertical sync signal VS from a television composite video signal;

a first means for generating a reference clock signal 4fH having a frequency N times the horizontal sync signal HS from the sync separator, wherein N is a natural number of 2 or more, a second means for generating a reference signal VR in synchronism with the vertical sync signal VS from the sync separator on the basis of the reference clock signal 4fH from the reference clock signal generator;

a frequency divider for generating the standard period signal PC having a predetermined standard period of the vertical sync signal VS in response to the reference clock signal 4fH;

a first circuit for generating a first window signal W1 having a pulse width containing the output time point of the standard period signal PC in response to the reference clock signal 4fH;

a second circuit for generating a second window signal having a pulse width larger than the first window signal W1 containing the output time point of the standard period signal PC in response to the reference clock signal 4fH;

a third means for switching between a standard mode to output the standard period signal PC and a non-standard mode to output the reference signal VR in response to a mode switching signal PM and producing either of the standard period signal PC and the reference signal VR as a vertical sync signal; and a fourth means for producing the mode switching signal PM and providing the third means therewith when the reference signal VR is not included in the period of the first window signal W1 but included in the period of the second window signal W2 in the standard mode and also when the reference signal VR is included in the period of the first window signal W1 but not in the period of the second window signal W2 in the non-standard mode, said means failing to produce the mode switching signal PM when the reference signal VR is included in the period of the first window signal W1 but not included in the period of the second window signal W2 in the standard mode and also when the reference signal VR is not included in the period of the first window signal W1 but in the period of the second window signal W2 in the non-standard mode, the television receiver further comprising:

visual display means; and a fifth means for displaying the received television composite video signal on the visual display means on the basis of the horizontal sync signal HS from the sync separator 54 and the vertical sync signal from the switching means.

\* \* \* \* \*